United States Patent [19]

Stocchiero

[11] Patent Number: 4,898,795
[45] Date of Patent: Feb. 6, 1990

[54] LID FOR LEAD-ACID ACCUMULATORS WITH ELASTIC AND DEFORMABLE POLE SEATS

[76] Inventor: Olimpio Stocchiero, 5 Via Kennedy, 36050 Montorso Vicentino, Italy

[21] Appl. No.: 253,033

[22] Filed: Oct. 4, 1988

[30] Foreign Application Priority Data

Oct. 9, 1987 [IT] Italy .................. 85615 A/87

[51] Int. Cl.⁴ .............................................. H01M 4/00
[52] U.S. Cl. ....................................... 429/66; 429/175; 429/180
[58] Field of Search .................. 426/66, 175, 178, 179, 426/180, 181, 182, 183, 185

[56] References Cited

U.S. PATENT DOCUMENTS 3,077,509  2/1963  Broussard.
4,455,356  6/1984  Barrett .................................... 429/66

FOREIGN PATENT DOCUMENTS 0228503  7/1987  European Pat. Off. .
7307438  6/1973  Fed. Rep. of Germany .
3035655  5/1982  Fed. Rep. of Germany .
0062657  5/1980  Japan ..................... 429/180
2087637  5/1982  United Kingdom ............... 429/175
2123205  1/1984  United Kingdom .

Primary Examiner—Donald L. Walton
Attorney, Agent, or Firm—Birch, Stewart, Kolasch & Birch

[57] ABSTRACT

A flat lid for lead-acid accumulators contains openings which are provided with elastic seats for the accommodation of poles. Around each opening for the passage of the poles of an accumulator is provided an elastic diaphragm, the longitudinal profile of which is suited to be elastically deformable in its axial direction. A pole of the accumulator is connected with the diaphragm by means of a ring-shaped seat which is present at the end opposed to the area for the connection with the lid. When a lengthening of the pole of the accumulator eventually occurs during its life-span, it will be absorbed by the deformation of the diaphragm so that the lid will not be subjected to stresses which might otherwise damage or disconnect it from the accumulator with serious consequences.

6 Claims, 2 Drawing Sheets

LID FOR LEAD-ACID ACCUMULATORS WITH ELASTIC AND DEFORMABLE POLE SEATS

BACKGROUND AND SUMMARY OF THE INVENTION

It is known that the lid of each element of a lead-acid accumulator must perform two main and essential functions. The first function is that of granting tightness, so as to avoid possible leaks of the electrolyte contained within the accumulator, thereby preventing damage which could be caused by said electrolyte because of its high corrosive power.

The second function is that of allowing the lengthening of the positive pole, which will become longer during the life span of the accumulator due to a known electrochemical phenomena. The lengthening of the pole must occur so that it does not exert any pressure against the lid to which it is attached, so as not to cause the rupture or the disconnection of the lid itself. Since the lengthening of the positive pole, due to the aging process is between 0,5 and 2%, the phenomenon acquires a special relevance in industrial accumulators where the elements reach heights sometimes exceeding 650 mm.

A known solution of this problem consists in sealing the area between the lid and the accumulator case with a plastic-type binder which insures the tightness between the lid and the case and, at the same time, a certain, although limited, elasticity. This expedient solves the problem in car accumulator batteries, but it does not solve the problem in the industrial accumulators, which, as has been said, are very tall.

In view of solving the problem of the lengthening of the positive pole in very tall accumulators, lids have been developed, which in the pole connection area, have a special shape and a decrease in the lid thickness in order to make the lid elastically deformable in correspondence with the poles. This expedient, which solves the problem of the lengthening of the positive pole presents, however, the disadvantage that, in order to apply it in the manufacture of lids for accumulators having a width which is much reduced in relation to its height, as in the case of lids for 2PzS-type accumulators according to the DIN 43595 standards, it is necessary to drastically reduce the diameter of the poles.

In fact, because of the limited width of the lid, in order to have available on the lid the space which is indispensable for obtaining a special shape and the thickness reduction in correspondence with the poles, the only possibility is in fact that of decreasing the diameter of the poles.

The disadvantages arising from a decreased diameter in the poles are obvious.

A first disadvantage originates from the increased current density passing through the pole in this case, which generates more heat with a subsequent energy loss.

Another disadvantage consists in the necessity of having to use, for the 2PzS-type accumulators according to DIN Standards, poles having a smaller diameter than the poles which are normally used in the manufacture of the 3PzS accumulators and of the subsequent sizes, with the ensuing economical and organizational difficulties due to the necessity of having to maintain a stock of poles of two different sizes.

Pat. No. 85653/A/81 has been registered in the name of the inventor of the present invention, in which there has been described a lid for accumulators presenting a special concave shape suited to guarantee the elasticity and the lengthening of the poles, even in the case of lids having a limited width in relation to their length and overcoming the above-mentioned disadvantages.

Although this type of lid overcomes the lamented disadvantages, it still presents a limited elasticity when its width is considerably reduced in relation to its length, as is the case of the 2PzS-type lids according to the DIN 43595 Standards.

The purpose of the present invention is that of overcoming even this last limitation.

The main object of the present invention is that of providing a lid for lead-acid accumulators presenting elastic and deformable pole seats.

Another object of the present invention is that of obtaining a lid allowing the deformation of the accumulator poles, the elasticity of the seats connecting the poles with the lid being independent from the dimensions of the lid and constant under any circumstance.

Yet another object of the present invention is that of obtaining a lid for accumulators which allows the assembly of poles which are also assembled on the 3PzS-type lids, without impairing the elasticity of the lid.

Another object of the present invention is that of obtaining a lid for accumulators the usable width of which can, in any case, be totally used for the lodging of the poles.

A further object of the present invention is that of obtaining a lid for accumulators with removable poles which can be connected to the lid by means of a threaded bushing, so as to make it possible and easy to take them apart to facilitate their maintenance.

The above mentioned objects and others, which will be better set forth hereinbelow are fulfilled by the construction of a lid for lead-acid accumulators, which, in accordance with the claims, is characterized in that the seats for the connection of the poles present a diaphragm with a circular cross-section, which is elastic and flexible in its axial direction and is arranged coaxially around each opening for the passage of the accumulator poles, said diaphragm being connected on one side with the lid surface, while its opposite end presents a ring-shaped seat with an inner shoulder having an indented diameter and being suited to receive and hold in place the bushing locking the accumulator pole.

The obvious advantages of the present invention reside in the fact that the diaphragm permits the axial sliding of the pole in relation to the lid, while said diaphragm does not take up any significant space around the pole itself. It follows that the elasticity of the lid, which is meant to allow the sliding of the pole in relationship to the lid, is insured even in those accumulator batteries wherein the width of the lids only slightly exceeds the diameter of the poles and, for this reason, can not accept a completely flexible and elastic ring-shaped area around the pole.

Other characteristics and construction details will be better understood from a description of a preferred form of the present invention, which is given by way of illustration only, and is not meant to limit the scope of the invention, and which is represented by the drawings wherein.

Figure 1:
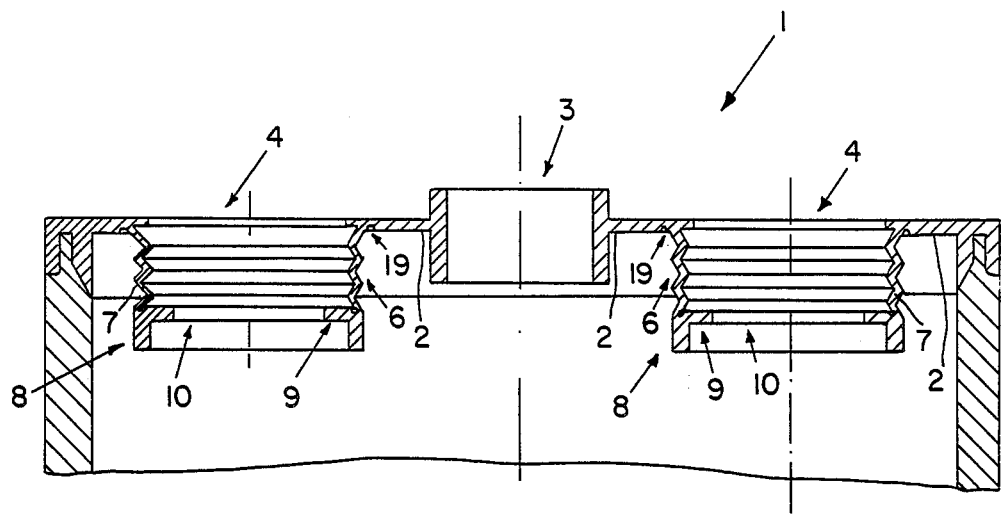
FIG. 1 shows a view of the lid according to the present invention.

As can be observed in FIG. 1 the lid according to the present invention, which is indicated as a whole by numeral 1, is moulded in plastic material and presents a central opening 3 for the introduction of an electrolyte into the accumulator. Also, two openings 4 are provided through which a pole 5 of the accumulator is adapted to pass.

After the electrolyte introduction has been completed, opening 3 will be sealed with a cap not shown in the drawings.

In FIG. 1 it can also be observed that around each opening 4 for the passage of the accumulator pole provided a diaphragm 6 constituting an integral part of lid 1, since it is connected with the lid by means of the connecting edge 19 positioned on the lid surface 2, facing the interior of the accumulator. The connecting edge 19 is obtained during the moulding of the lid, so as to form a single body with the lid.

Diaphragm 6 has a tubular shape with its main vertical symmetrical axis being co-axial with the axis of opening 4. It presents a transversal circular cross-section, whereas its walls 7 present a corrugated, bellows-shaped longitudinal cross-section.

Finally diaphragm 6 ends at its bottom with a smooth ring-shaped area 8 which presents in its interior a flat shoulder-ring 9 in correspondence with the inner indented diameter 10.

Figure 2:
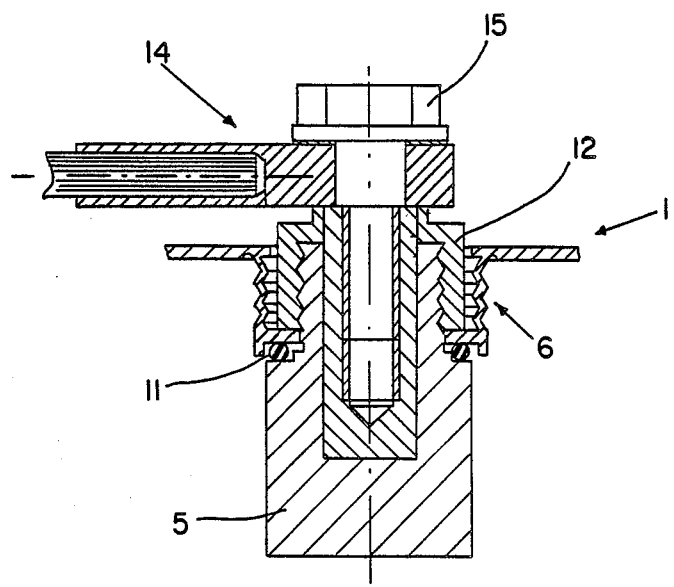
FIG. 2 shows another view of the lid according to the present invention with the bushing assembled in the pole elastic seat.

The presence of the ring-shaped area 8 permits the anchoring of the accumulator pole 5 on diaphragm 6 and, as a consequence, on lid 1. In fact, as can be observed from FIG. 2, pole 5 is inserted into opening 10 and by the interposition of the OR ring 11 it is pushed flush against the ring-shaped surface 9 when bushing 12 is tightened around pole 5.

After pole 5 has thus been locked on lid 1 by tightening bushing 12, it will be possible to proceed to the connection of the electric joints 14 by tightening the screws 15.

At this point it can be observed that the connection between pole 5 and lid 1 of the accumulator is obtained by means of diaphragm 6, which is elastic thanks to the special corrugated shape of its vertical walls.

It becomes obvious that a lengthening of pole 5 in the vertical direction, which occurs over the years because of the aging process of the elements, generates an axial compression on diaphragm 6, which, due to its elasticity, will become shorter, thereby absorbing the lengthening of pole 5, and thus preventing the lid 1 from being subjected to anomalous stresses.

From what has been described it becomes obvious that the main object of the present invention has been achieved, that is, the purpose of obtaining an accumulator lid provided with elastic seats for the connection of the poles.

It is also obvious how the other purpose of obtaining a pole connection, the elasticity of which is independent from the dimensions of the lid, has been reached. In fact, regardless of the dimensions, the elasticity of the seats for the connection of the poles depends solely from the thickness of diaphragm 6 and from the shape of the corrugations of the walls 7 which constitute its lateral surface.

It can also be understood how the special execution and arrangement of diaphragm 6 in correspondence with opening 4 is such as to allow the assembly of a pole 5 having a maximum diameter equalling the useful width of lid 1.

More specifically, the 2PzS-type lids according to the "Din" 43595 standards, manufactured in accordance with the invention, allow the assembly of poles, which are usually assembled on the lids of the 3PzS-type and of the subsequent types according to the above mentioned "Din" standards.

It also becomes evident how it is possible to apply to the lid, according to the present invention, removable poles, which can easily be removed for maintenance operations.

Figure 3:
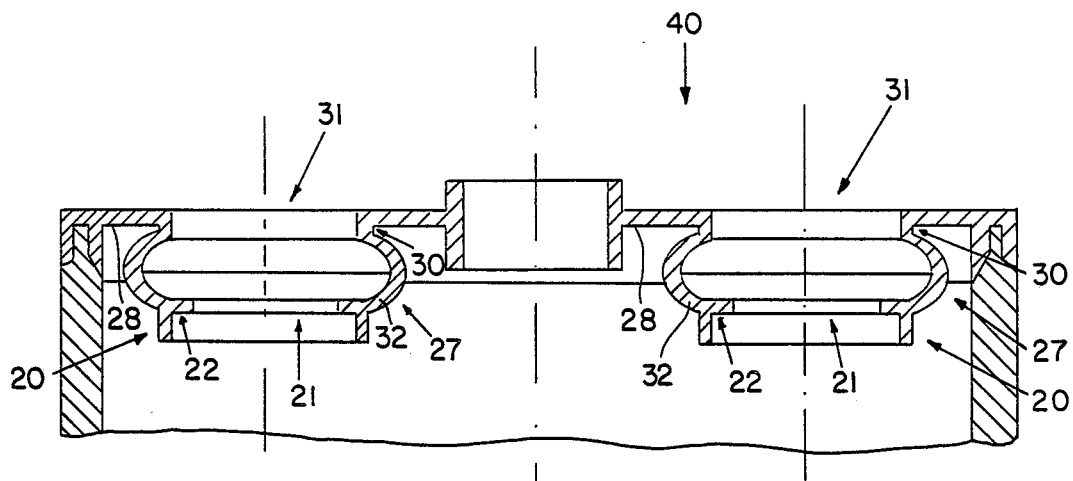
FIG. 3 shows a view of a variation of the same inventive idea.

FIG. 3 shows lid 40 which is an another embodiment of the elastic seat for the connection of the poles, based on the same inventive idea.

Figure 4:
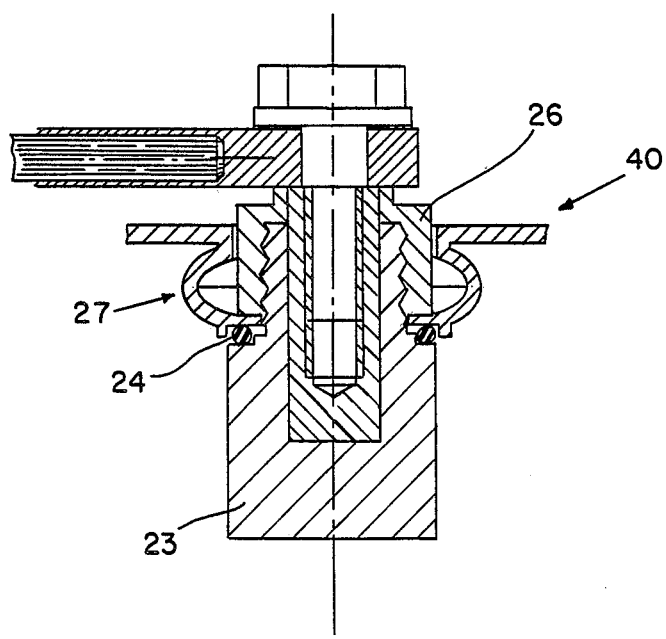
FIG. 4 shows a cross section of the lid of FIG. 3 with the bushing assembled in the seat.

This connection seat also presents, as was the case in the previously described seat, a ring-shaped area 20 with an inner indented diameter, so that it presents an inner, ring-shaped surface 22 allowing the assembly of pole 23 through the interposition of a sealing ring 24, in exactly the identical way, as has previously been described. In this case, too, the locking and the sealing of pole 23 occurs by tightening around it bushing 26, as can be observed in FIG. 4.

In this embodiment the deformable elastic element consists of diaphragm 27 presenting a toroid longitudinal cross-section 32 arranged around each opening 31 for the passage of the poles 23 of the accumulator and connected with lid 40 by means of the ring-shaped connection area 30.

In this variation of execution, too, diaphragm 27 should be manufactured during the moulding process of lid 40, so that lid 40, diaphragm 27 and the ring-shaped seat 30 arranged on the lid surface 28, which faces the interior of the accumulator, constitute a single body.

From what has been described, it is evident that this variation of execution, too, makes it possible to reach all the proposed purposes and to obtain all the inherent advantages.

The object of the present invention can be manufactured also with shapes differing from the ones described herewith, as far the form is concerned, or the means of connection between the diaphragms and the lid, or even the dimensions of the diaphragms 6 and 27. It will also be possible, during its manufacture, to apply improvements of a constructive nature without, therefore, exceeding the scope of the protection rights of the present invention.

I claim:

1. A lead-acid accumulator lid made of a plastic material and having a substantially planar body with an upper and lower surface, said body having and edge portion suited to be permanently attached to an accumulator case;
   a central opening for the filling and refilling of the electrolyte contained in the accumulator;
   a pair of openings provided in the lid for the passage of electric poles which extend from the accumulator, said openings having substantially circular edges;
   an expandable elastic, flexible, substantially tubular member extending from each of said edges into said lid for providing a sealing connection with said poles, said tubular member extending axially to said openings, wherein said expandable elastic flexible tubular members are formed integrally with said lid and are shaped to be compressible, co-axially to said openings, said tubular members projecting from said opening edges inwardly of the accumulator case, so that the upper surface of the lid is substantially planar and free of projections in correspondence with said openings, whereby the axial sliding of the poles relative to the lid is effected thereby insulating the lid from stress.

2. The lid according to claim 1, wherein the main diameter of said tubular members is approximately the same as the diameter of said openings.

3. The lid according to claim 1, wherein said tubular members have an axial cross section with a bellows-like shaped corrugated profile.

4. The lid according to claim 1, wherein said tubular members have an axial cross section with a thoroidal profile.

5. The lid according to claim 1, wherein said members have free edges arranged for sealing connection with said poles.

6. The lid according to claim 5, wherein said free edges of said members are provided with annular seats for receiving OR-rings cooperating with abutment surfaces formed peripherally of said poles.

* * * * *